(No Model.)

O. CULLMANN.
VELOCIPEDE.

No. 504,079. Patented Aug. 29, 1893.

Witnesses:
J. Halpenny
Wm. S. Hodges

Inventor:
Otto Cullmann
By his Attorneys
Gridley & Hopkins

UNITED STATES PATENT OFFICE.

OTTO CULLMANN, OF CHICAGO, ILLINOIS.

VELOCIPEDE.

SPECIFICATION forming part of Letters Patent No. 504,079, dated August 29, 1893.

Application filed October 6, 1892. Serial No. 448,031. (No model.)

*To all whom it may concern:*

Be it known that I, OTTO CULLMANN, a citizen of the United States, residing at Chicago, in the county of Cook and State of Illinois, have invented certain new and useful Improvements in Velocipedes, of which the following is a specification, reference being had to the accompanying drawings, which is made a part hereof, and in which—

Figure 1:
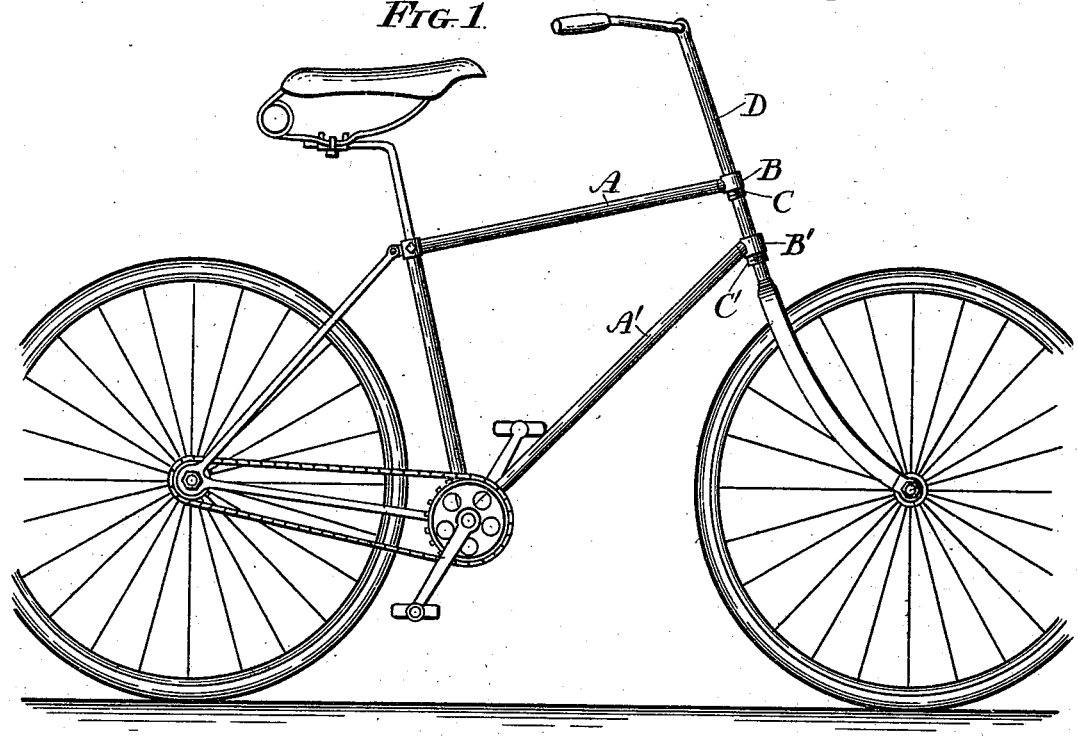
Figure 2:
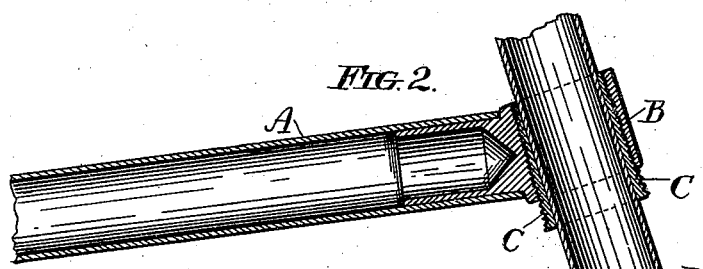
Figure 3:
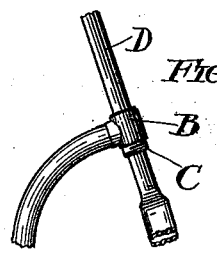

Figure 1, is a side elevation of a bicycle embodying the invention. Fig. 2, is a vertical section (on a larger scale) of a portion of the steering rod and frame, constructed and united in accordance with the invention. Fig. 3, is an elevation of a portion of the steering rod and backbone of a lady's safety bicycle embodying the invention.

As customarily made, the head of a velocipede is of complicated and costly construction, the means provided for compensating for wear being particularly costly, and the objects of the present invention are to improve, simplify, and cheapen this part of the machine, a further object being to reduce its weight.

To these ends, the invention consists in certain features of novelty that are particularly pointed out in the claims.

Referring to Figs. 1 and 2 of the drawings, A and A', represent two parts of the frame of a bicycle, the forward extremities of which are usually coupled together by a sleeve through which the steering rod passes and within which it has its bearing, many movable and immovable parts being used for making the connection. According to the present invention internally screw-threaded collars B and B' are secured to the extremities of the parts A and A' and the steering rod D is provided with correspondingly threaded portions or enlargements C and C'. These enlarged portions preferably consist of collars brazed or otherwise suitably secured to the rod. Before the handle bar is put on, the upper end of the steering rod is passed, first through the collar B' and then through the collar B and when the threaded portions C and C' are brought to the collars B and B' respectively, the steering rod is turned until the parts are brought to the relative position shown in the drawings. By this means the steering rod and frame are secured to each other, leaving the rod free to be turned for steering the machine.

In order to compensate for wear between the inner surface of the collars B, B' and the portions of the steering rod that have contact therewith, I prefer to taper them slightly, the taper being somewhat exaggerated in the drawings for the sake of clearness. The threads are quite close together and of gradual ascent, so that by giving the steering bar one complete turn, the parts will be brought together far enough to take up a slight amount of wear but not far enough to cause them to bind. In order to permit the parts to be assembled, the collar B' is of sufficient size to permit the enlarged part C to pass through it without binding.

In applying the invention to bicycles of the "lady's safety" type, and other types in which only one part of the frame is carried forward to the head, instead of using the two collars B and B', only one is used, as shown at B in Fig. 3.

Having thus described my invention, what I claim as new therein, and desire to secure by Letters Patent, is—

1. In a velocipede, the combination with the frame having a collar provided with an internal threaded tapering bore, of a steering rod having a correspondingly tapered portion provided with external threads, engaging the threads of the collar, substantially as set forth.

2. In a velocipede, the combination with the frame having the collars B and B' provided with tapering bores of different diameters, of the steering rod having the correspondingly tapered portions C and C', and means for holding the parts together, substantially as set forth.

3. In a velocipede, the combination with the frame having the collars B and B' provided with screw threaded tapering bores of different diameters, of the steering rod having corresponding screw threaded tapering portions C and C', screwed into the collars, substantially as set forth.

OTTO CULLMANN.

Witnesses:
L. M. HOPKINS,
J. HALPENNY.